United States Patent
Yap

(10) Patent No.: US 8,190,180 B2
(45) Date of Patent: May 29, 2012

(54) MOBILE INFORMATION PROVIDING AND TRANSACTION SYSTEM

(76) Inventor: Chong Beng Yap, Singapore (SG)

( * ) Notice: Subject to any disclaimer, the term of this patent is extended or adjusted under 35 U.S.C. 154(b) by 737 days.

(21) Appl. No.: 12/226,240

(22) PCT Filed: Apr. 12, 2007

(86) PCT No.: PCT/SG2007/000099
§ 371 (c)(1),
(2), (4) Date: Oct. 10, 2008

(87) PCT Pub. No.: WO2007/117223
PCT Pub. Date: Oct. 18, 2007

(65) Prior Publication Data
US 2009/0170485 A1    Jul. 2, 2009

(30) Foreign Application Priority Data
Apr. 12, 2006 (SG) .................................. 200602450

(51) Int. Cl.
H04M 7/00 (2006.01)
(52) U.S. Cl. .................. 455/466; 455/456.2; 455/412.1; 455/432.3
(58) Field of Classification Search .................. 455/406, 455/412.1, 414.1, 414.2, 417, 432.3, 466, 455/412.2, 456.2, 456.3; 707/1, 9, 10, 101, 707/206, 803, 758; 709/217, 225; 705/10, 705/26, 14
See application file for complete search history.

(56) References Cited

U.S. PATENT DOCUMENTS

| 7,024,205 | B1 * | 4/2006 | Hose ........................... 455/456.1 |
| 7,711,094 | B1 * | 5/2010 | Olshansky et al. ............. 379/45 |
| 7,881,453 | B2 * | 2/2011 | Khuc et al. ................ 379/265.01 |
| 2001/0049275 | A1 * | 12/2001 | Pierry et al. .................... 455/414 |
| 2002/0004736 | A1 * | 1/2002 | Roundtree et al. .............. 705/10 |
| 2006/0095540 | A1 * | 5/2006 | Anderson et al. ............. 709/217 |
| 2007/0055785 | A1 * | 3/2007 | Stevens ........................ 709/229 |
| 2008/0270224 | A1 * | 10/2008 | Portman et al. ................. 705/10 |
| 2009/0049057 | A1 * | 2/2009 | Ghani ............................. 707/10 |

FOREIGN PATENT DOCUMENTS

| JP | 10-177469 A | 6/1998 |
| JP | 2005-165866 A | 6/2005 |
| WO | WO-2004/079612 A1 | 9/2004 |
| WO | WO-2005/032105 A1 | 4/2005 |

* cited by examiner

*Primary Examiner* — Jean Gelin

(57) ABSTRACT

A method and a system (200) for providing specific information on demand to at least one requester on a mobile messaging network are disclosed. The method and system involve the steps of receiving a query from the at least one requester and extracting at least one search character from the query. The method and system (200) also involve providing at least one database (212) containing at least one heading (214), wherein each of the at least one heading (214) is associated with at least one field (216) while each of the at least one field (216) is associated with at least one entry (218). The method and system (200) further involve matching each of the at least one search character with the at least one heading (214), the at least one field (216) and the at least on entry (218) to thereby associate one of the at least one entry (218) with the query. The method and system (200) finally involve retrieving the one of the at least one entry from the at least one database (212).

22 Claims, 2 Drawing Sheets

MOBILE INFORMATION PROVIDING AND TRANSACTION SYSTEM

FIELD OF INVENTION

The invention relates generally to retrieval of information through a mobile network. In particular, the invention relates to a method for providing specific information on demand to requesters on a mobile network.

BACKGROUND

Advancements in telecommunication have provided near real time communication over a mobile network. The wide coverage of the mobile network advantageously allows people to communicate through their mobile phones over great distances.

Furthermore, mobile networks of today not only support voice communication, but also text or image communication. Typically, this is made possible by mobile phones that are capable of transceiving and displaying on display screen text and image.

An example of a widely used mobile network is the General Packet Radio Service (GPRS) network. Communication information in the form of voice, text or image is digitized by a mobile phone and transmitted via the GPRS network to another mobile phone. Communication information is therefore capable of being sent or received in near real time.

Presently, a mobile phone user is able to obtain information, such as news reports and the weather forecasts on a mobile phone. A service provider typically provides the information to a service subscriber who accesses the information through a text format service such as the Short Message Service (SMS).

However, a requester for the information is usually unable to obtain the required information, for example, in the form of a single SMS message. The requester is usually required to send SMS messages in stages to the service provider before desired information can be finally obtained.

There is therefore a need for a method for improving the efficiency of providing information requested by requesters through mobile phones.

SUMMARY

Embodiments of the invention disclosed herein improve the efficiency of providing information requested by requesters through mobile phones.

In accordance to a first embodiment of the invention, a method for providing information to at least one requester on a mobile messaging network is disclosed. The method involves the steps of receiving a query from the at least one requester and extracting at least one search character from the query. The method also involves providing at least one database containing at least one heading, wherein each of the at least one heading is associated with at least one field while each of the at least one field is associated with at least one entry. The method further involves matching each of the at least one search character with the at least one heading, the at least one field and the at least one entry to thereby associate one of the at least one entry with the query. The method finally involves retrieving the one of the at least one entry from the at least one database.

In accordance to a second embodiment of the invention, a system for providing information to at least one requester on a mobile messaging network is disclosed. The system has a transceiver wirelessly connectable to the mobile messaging network for receiving a query from each of the at least one requester. The system also has a processor for extracting at least one search character from the query and at least one database containing at least one heading, each of the at least one heading being associated with at least one field, each of the at least one field being associated with at least one entry. When in use, the processor matches each of the at least one search character with the at least one heading, the at least one field and the at least one entry to thereby associate one of the at least one entry with the query and retrieves the one of the at least one entry from the at least one database.

BRIEF DESCRIPTION OF THE DRAWINGS

Two embodiments of the invention are described hereinafter with reference to the drawings, in which.

DETAILED DESCRIPTION

With reference to the drawings, a method and a system for providing information to one or more requester on a mobile messaging network are disclosed. Conventional methods and systems for providing information usually require a requester to send a few SMS messages via their mobile phones to a service provider before desired information can be eventually obtained. However, such conventional methods and systems do not provide requesters with an efficient way of obtaining information that are requested thereby.

The method and system as disclosed according to embodiments of the invention advantageously allow efficient provision of information available on a database to one or more requesters on a mobile messaging network. The information is provided directly in a single message to a requester whom has requested for the information via a mobile phone with such information including data such as phone numbers, addresses, company names, flight arrival and departure times etc. The method and system therefore allows a mobile phone user to retrieve information in a direct and therefore simple manner.

For purposes of brevity and clarity, the description of the invention is limited hereinafter to a method and a system for providing information to at least one requester on a mobile messaging network, such as a mobile phone network. This however does not preclude the application of embodiments of the invention to providing information to requesters on different mobile messaging networks. The functional principles fundamental to the embodiments of the invention remain the same throughout the variations.

First and second embodiments of the invention are described hereinafter in greater detail with reference to FIGS. 1 and 2, wherein like elements are assigned and labeled with like numerals and described accordingly.

Figure 1:
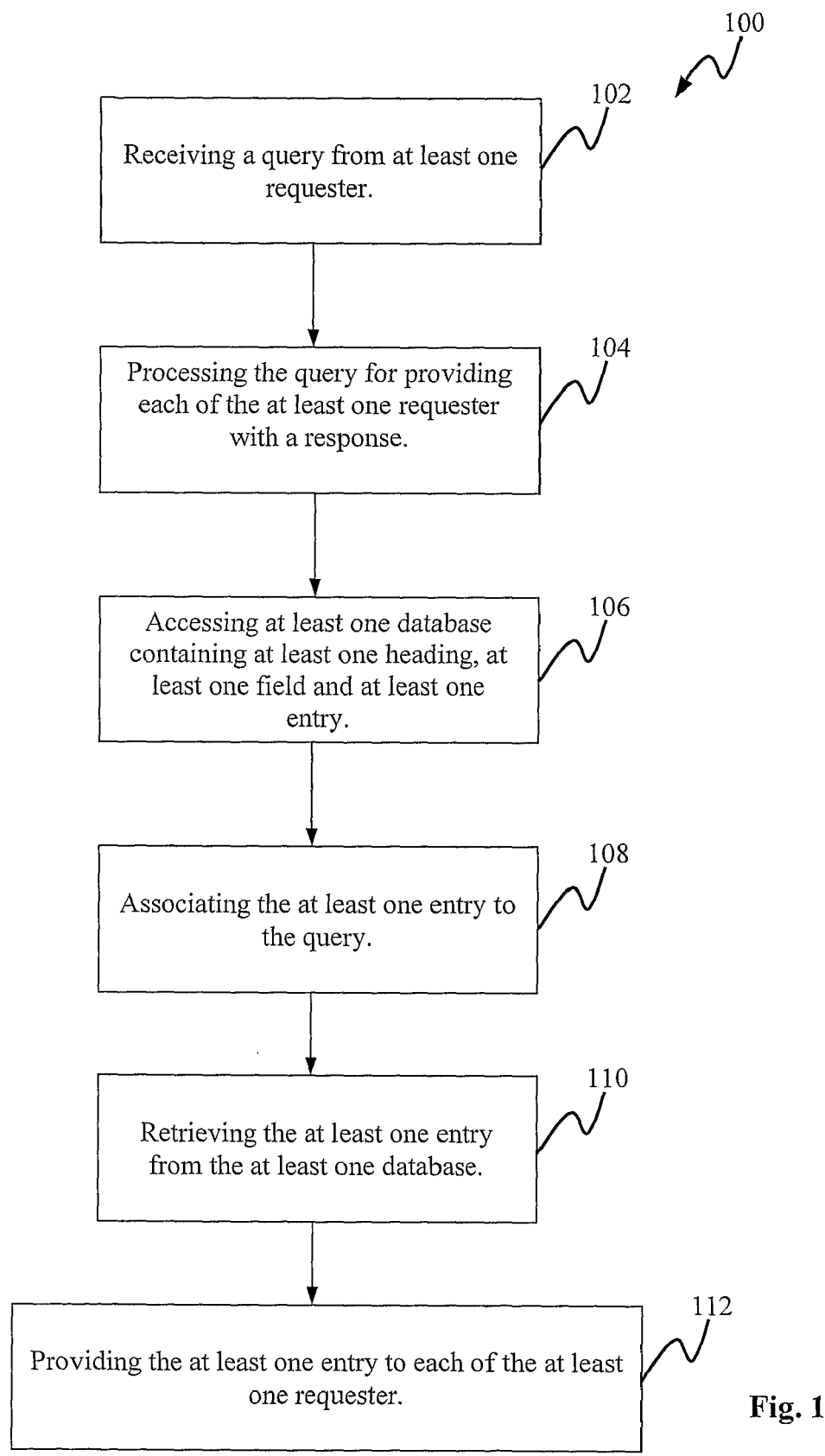
FIG. 1 is a flow diagram according to a first embodiment of the invention.

With reference to FIG. 1, a flow diagram of a method 100 for providing information to one or more requesters on a mobile messaging network according to a first embodiment of the invention is shown. The method 100 involves an initial step 102 of receiving a query from a requester via the mobile messaging network, such as the Short Message Service (SMS), Enhanced Message Service (EMS) or Multimedia Message Service (MMS). The requester preferably sends an SMS message containing the query using a mobile device, for example, a mobile phone. A transceiver, such as a General Packet Radio Service (GPRS) modem, receives the SMS message containing the query.

Once the query is received by the GPRS modem, a server or processor that is connected to the modem for subsequently providing the requester with a response first proceeds to process 104 the query. The query is processed for identifying search terms or characters found in the query. The response contains information corresponding to the query provided by the requester. The information is preferably pre-stored in databases located in or connected to the server. Each of the databases is preferably customizable and updateable and is capable of storing a wide variety of information relating to, for example, directories of businesses, transportation schedules, commercial product details, maps and other related data.

The response is provided to the requester by first accessing 106 the database containing information potentially relatable with the query. The database preferably has a number of directories. Each directory preferably contains a plurality of headings that further contains a series of fields. Each field preferably has multiple entries that store information for relating with a query.

The next step 108 of the method is to associate one or more entries with the query and for eventually retrieving the entries from the database. After the entries are retrieved 110 from the database, the server then transmits 112 the entries in SMS format, EMS format or MMS format via the GPRS modem and the mobile messaging network to the requester to thereby provide the response to the requester.

In the case where no entry is found to be relatable with the query, a response indicating the unavailability of an entry is provided to the requester who sent the query.

Figure 2:
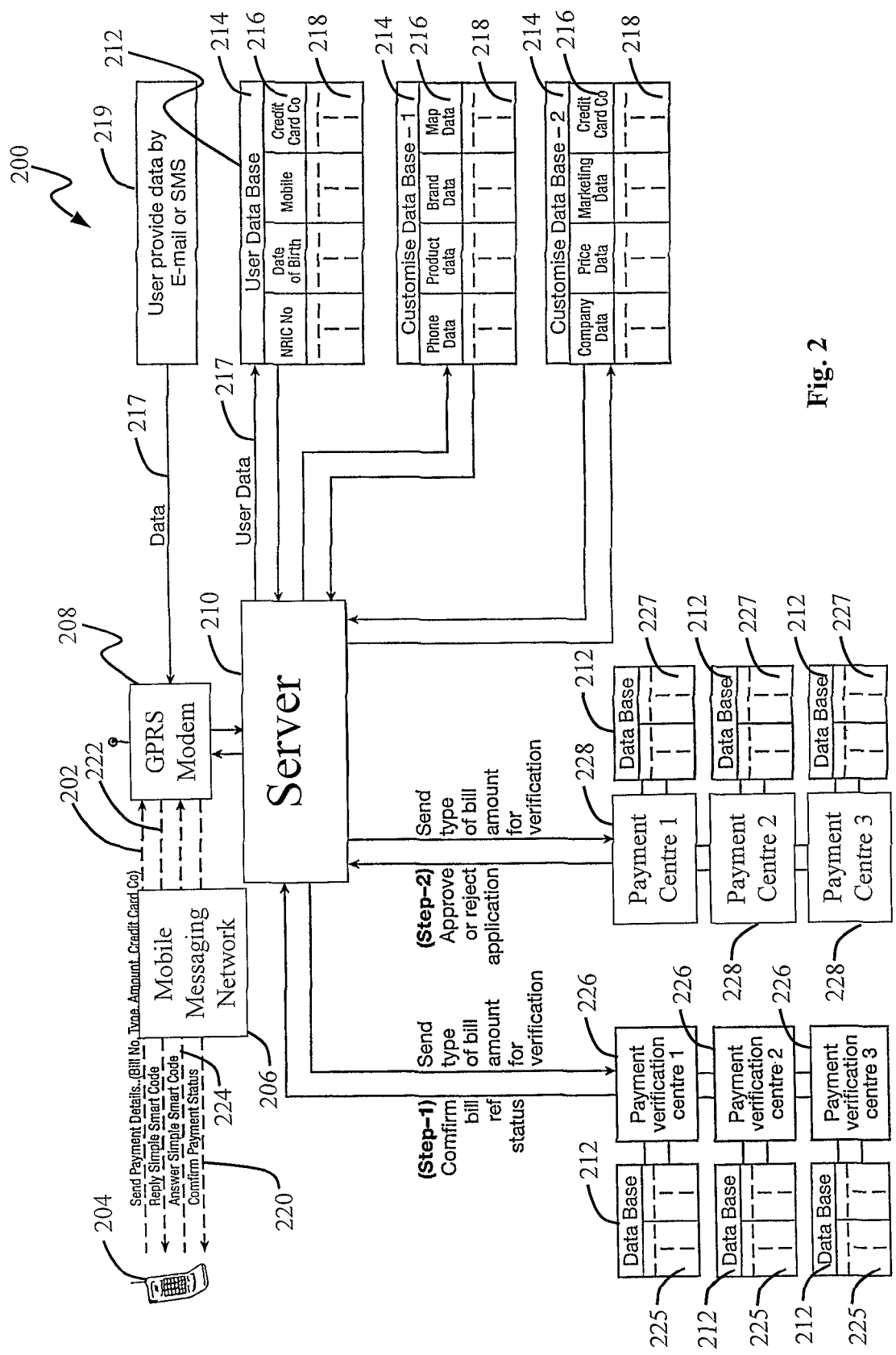
FIG. 2 is a system diagram according to a second embodiment of the invention.

FIG. 2 illustrates a system 200 for providing information to one or more requesters on a mobile messaging network 206 according to a second embodiment of the invention. The system 200 first receives a query 202 from a requester through a mobile phone 204 preferably in the form of an SMS message. The mobile phone 204 is wirelessly linked to the mobile messaging network 206, such as the GPRS network, for transmitting the query 202 to a transceiver or modem 208 capable of receiving the query 202 through the GPRS network. The modem 208 is preferably a GPRS modem.

The modem 208 is connected to a server 210 or processor that has a predetermined number of databases 212. Each of the databases 212 is preferably customizable for storing a particular category of information, such as business or product information. The databases 212 are preferably modifiable by the server 210 for facilitating the customization of the databases 212. The modification of the databases 212 is preferably achieved and facilitated through use of input and output devices, such as a keyboard and a display monitor, that are attached to the server 210.

Each of the databases 212 is identifiable by a heading 214 and has a plurality of fields 216 under the heading 214. Each of the plurality of fields 216 groups a specific set of entries 218 or data. In this manner, a query 202, for example being related to a fax number of a retail shop, is locatable by first matching the query 202 to a database 212 with a "company" heading 214 and then to a "fax" field 216 that contains an entry 218 for the fax number. The fax number is subsequently extracted from the database 212 and formatted as an SMS message containing the fax number. The SMS message is then transmitted as a response 220 via the modem 208 and the mobile messaging network 206 to a mobile phone 204 that sent the query 202.

In another example, a query 202 pertaining to a locality map showing a company's location is retrievable by first matching the query 202 to a database 212 with a "company" heading 214 and then to a "map" field 216 that contains an entry 218 for the map. The locality map is subsequently extracted from the database 212 and formatted as an MMS message containing the locality map (not shown). The locality map may further contain other information such as a listing of all public buses that travels near the company's location and names of train stations that are within a predetermined proximity to the company's location. The MMS message is then transmitted as a response 220 via the modem 208 and the mobile messaging network 206 to a mobile phone 204 that sent the query 202.

The system 200 is therefore advantageously capable of providing specific information selected from a wide range of available information on demand to a requester through a mobile phone and a single query, for example, in the form of one simple SMS, EMS or MMS message.

Additionally, the system 200 is capable of providing information based on the locality of a requester. The 210 server is able to detect the area code associated with a query sent by the requester via a mobile phone and link the query to a database containing information specific to the locality of the requester. In this manner, information that is location specific, such as a local restaurant phone number or county or country specific emergency numbers can be made available to the requester who has traveled from a foreign county or country. The detection of locality is preferable based on auto selection or user defined selection.

In yet another example, a requester sends a query 202 to the server 210. The server 210 receives the query 202 via the modem 208 and the mobile messaging network 206. The query 202 is related to the availability of and booking requests for tables for a predetermined number of persons in a particular café.

The query 202 is first matched to a database 212 with the particular café heading 214 and then to a "table number" field 216. The "table number" field 216 provides information corresponding to the availability of tables in the particular café. If tables are available for the predetermined number of persons, the server 210 will preferably send an SMS message to the requester indicating that a particular table has been booked for the predetermined number of persons. The database 212 is then updated accordingly to reflect the booking made to the particular table. If no tables are found, an SMS message indicating the unavailability of tables is preferably sent to the requester.

In this example, the database 212 is preferably updated in real-time so that the "table number" field 216 reflects the true availability of tables in the particular café at any given instant.

The server 210 is preferably capable of supporting a verification process for verifying the identity of the requester. In this way, the system 200 is advantageously suitable for providing secured financial transactions through the mobile messaging network 206. This is achievable by dedicating one or more databases 212 for verification and payment purposes and having the requester registering with the system 200 for providing user information 217, such as the requester's identity number or date of birth, for the purposes.

The user information 217 is preferably made available to the server 210 via an input system 219, such as the Internet, SMS, EMS or MMS messages, for storing or updating the user information 217 in those dedicated databases 212. Once registration of the user information 217 is completed, the server 210 preferably sends a personal pin number to the requester via an SMS message.

The verification process used for providing a requester with secured financial transactions is described in the example below.

The requester is able to request for bill payment by first sending information comprising, for example, a bill number, a bill type, a billing amount and the name of a credit card company to the server 210 preferably via an SMS message 202. This information is then used for initiating a verification process for identifying the requester. The server subsequently sends a first response or SMS message 222 to the requester for verifying the identity of the requester.

The first SMS message 222 preferably require the requester to provide the personal pin number and randomly require the requester to provide additional details for verification, for example an identity number or a date of birth. The requester then sends the required information to the server through a return SMS message 224. The server 210 receives the return SMS message 224 containing the required information and matches the information with an entry 218 in a dedicated database 212. The verification process is successful if the required information matches the entry 218 in the dedicated database 212. Otherwise, an SMS message may be sent to the requester to request for resending of the required information.

Once the verification process is successful, the information originally sent by the requester is made available to a payment verification centre 226 meant for a particular bill type. The payment verification centre 226 then verifies the bill number and the billing amount against billing information 225 that is stored in a database 212 associated therewith.

If the bill number and billing amount has been successfully verified, the information originally sent by the requester is made available to a payment centre 228, such as a bank or credit card centre meant for a particular credit card company. The payment centre 228 then searches and retrieves credit information 227 stored in a database 212 associated therewith for verification.

Once the search and retrieval are completed, the bill payment is either approved or rejected depending on the results of the search and retrieval. A second response or SMS message 220 for confirming payment status is then sent to the requester for completing the bill payment.

Although only two embodiments of the invention are disclosed, it becomes apparent to one skilled in the art in view of this disclosure that numerous changes or modifications can be made without departing from the true scope of the invention. Accordingly, all such changes or modifications are intended to be covered by the appended claims.

The invention claimed is:

1. A method for providing information to at least one requester on a mobile messaging network, the method comprising the steps of:
   (a) receiving a query from at least one requester;
   (b) extracting at least one search character from the query;
   (c) providing at least one database containing at least one heading, each of the at least one heading being associated with at least one field, each of the at least one field being associated with at least one entry;
   (d) matching each of the at least one search character with the at least one heading, the at least one field and the at least one entry to thereby associate one of the at least one entry with the query;
   (e) retrieving the one of the at least one entry associated with the query from the at least one database; and
   (f) responding to each of the at least one requester by providing the one of the at least one entry to the each of the at least one requester to thereby provide a response to the each of the at least one requester.

2. The method of claim 1, wherein the response is in at least one of Short Message Service (SMS), Enhanced Message Service (EMS) and Multimedia Message Service (MMS) format.

3. The method of claim 1, wherein the response is provided through the mobile messaging network.

4. The method of claim 1, wherein the step of providing at least one database containing at least one heading comprising the steps of:
   determining the locality of the at least one requester; and
   selecting and accessing at least one database containing at least one heading based on the locality of the at least one requester.

5. The method of claim 4, wherein the step of determining locality includes the step of:
   determining locality based on one of auto selection and user defined selection.

6. The method of claim 1, wherein step (a) includes receiving the query in at least one of Short Message Service (SMS), Enhanced Message Service (EMS) and Multimedia Message Service (MMS) format.

7. The method of claim 1, wherein the query in step (a) includes a request for information.

8. The method of claim 1, wherein the query in step (a) includes a request for updating the at least one database.

9. The method of claim 1, wherein the query in step (a) includes a request for processing of a financial transaction.

10. The method of claim 1, wherein step (c) further comprising the step of updating the at least one entry of the least one database via at least one of Short Message Service (SMS), Enhanced Message Service (EMS), Multimedia Message Service (MMS) and the Internet.

11. The method of claim 1, wherein at least one of the at least one requester is a mobile communication device.

12. A system for providing information to at least one requester on a mobile messaging network, the system comprising:
   a transceiver wirelessly connectable to the mobile messaging network for receiving a query from each of the at least one requester;
   a processor for extracting at least one search character from the query;
   and at least one database containing at least one heading, each of the at least one heading being associated with at least one field, each of the at least one field being associated with at least one entry,
   wherein when in use the processor matches each of the at least one search character with the at least one heading, the at least one field and the at least one entry to thereby associate one of the at least one entry with the query and retrieves the one of the at least one entry from the at least one database, and
   wherein the system responds to each of the at least one requester by providing the one of the at least one entry to the each of the at least one requester to thereby provide a response to the each of the at least one requester.

13. The system of claim 12, wherein the response is provided in at least one of Short Message Service (SMS), Enhanced Message Service (EMS) and Multimedia Message Service (MMS) format.

14. The system of claim 12, wherein the response is provided through the mobile messaging network.

15. The system of claim 12, wherein the processor selects and accesses the at least one database containing the at least one heading based on the locality of the at least one requester.

16. The system of claim 15, wherein the processor determines the locality based on one of auto selection and user defined selection.

17. The system of claim 12, wherein the query is received in at least one of Short Message Service (SMS), Enhanced Message Service (EMS) and Multimedia Message Service (MMS) format.

18. The system of claim 12, wherein the query includes a request for information.

19. The system of claim 12, wherein the query includes a request for updating the at least one database.

20. The system of claim 12, wherein the query includes a request for financial transaction.

21. The system of claim 12, wherein the processor updates the at least one entry of the least one database via at least one of Short Message Service (SMS), Enhanced Message Service (EMS), Multimedia Message Service (MMS) and the Internet.

22. The system of claim 12, wherein at least one of the at least one requester is a mobile communication device.

* * * * *